Oct. 21, 1924.

F. H. GODFREY 1,512,418

AUTOMOBILE DISK WHEEL

Filed April 24, 1924

INVENTOR:
Frank Henry Godfrey
BY A. M. Carlsen
ATTORNEY.

Patented Oct. 21, 1924.

1,512,418

UNITED STATES PATENT OFFICE.

FRANK HENRY GODFREY, OF ST. PAUL, MINNESOTA.

AUTOMOBILE DISK WHEEL.

Application filed April 24, 1924. Serial No. 708,743.

*To all whom it may concern:*

Be it known that I, FRANK HENRY GODFREY, a citizen of the United States, residing at St. Paul, in the county of Ramsey and State of Minnesota, have invented certain new and useful Improvements in Automobile Disk Wheels, of which the following is a specification.

My invention relates to disk wheels for automobiles and other vehicles using wheels with rubber tires of either the solid or pneumatic type. The object is to provide a disk wheel that is inexpensive to manufacture, very durable and from which tires may be easily removed and replaced without the use of special tools and without risk of injuring the beads of a tire.

Figure 1:
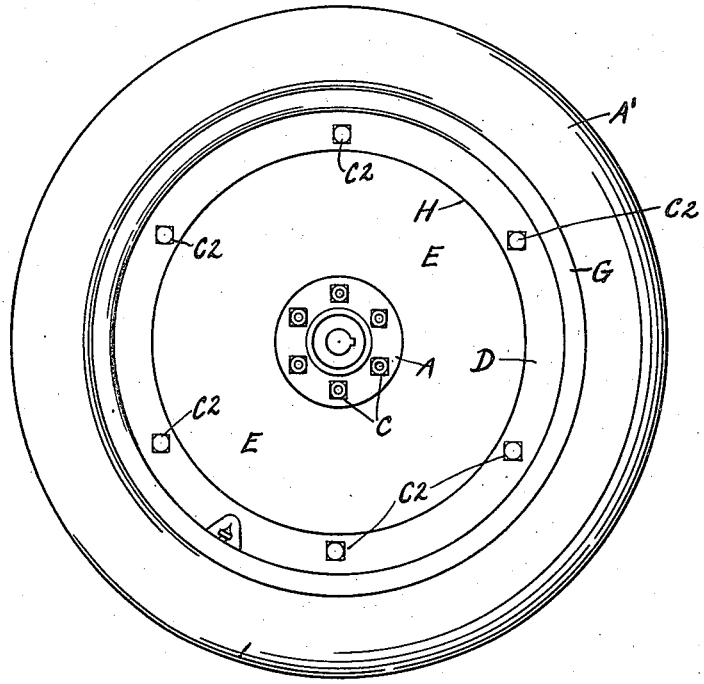
Figure 2:
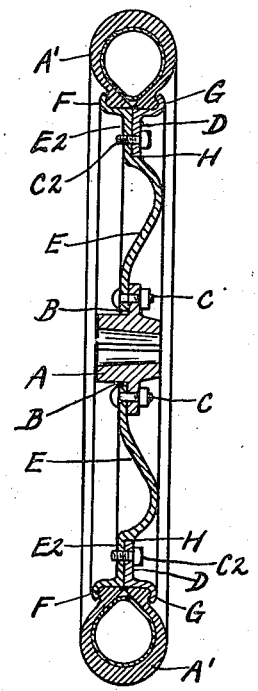
Figure 3:
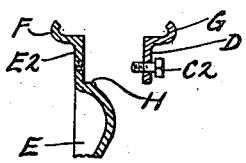

In the accompanying drawing:

Fig. 1 is a side elevation of my complete wheel with hub and tire. Fig. 2 is a diametrical section of Fig. 1, and Fig. 3 is a fragmentary view of portions of Fig. 2 separated.

Referring to the drawing by reference characters, the wheel is composed of two members, one of which is a concavo-convex disk E having a central aperture B in which to secure any suitable hub A by rivets, or bolts, C. The member E has an annular, rectangular shoulder H and beyond the same a comparatively narrow plain, circular flange $E^2$, termintaing in a peripheral channel F, which is to hold one of the beads of the rubber tire A'. The other wheel member consists of a flat circular flange D fitting snugly upon the shoulder H and secured to the part $E^2$ by bolts, or screws $C^2$. Said flange D carries a peripheral channel G which together with the channel F forms the felly of the wheel and the grooved rim in which the tire is held.

The tire may be put into the groove or removed therefrom by simply removing the screw or bolts $C^2$ and separating the two wheel members. The invention avoids expensive construction such as securing two spaced disks together with or without using two hub members, threaded or bolted together, and in some cases they have slanting radial contact surfaces which are very hard to fit and hold together against sliding movement of the parts.

What I claim is:

1. A wheel of the class described, having a peripheral channel for holding the beads of a rubber tire; said wheel being composed of a main member and a secondary member, the main member having a concavo-convex disk with a central hole for the hub of the wheel, and the outer portion of the disk formed with an angular shoulder and a flat flange extending beyond the shoulder and having its peripheral portion formed with a lateral groove making half of the channel; the secondary member having a similar groove making the other half of the channel and a flat circular flange projecting radially from its inner edge and fitting snugly about the angular shoulder, and bolts passed through the said flanges and securing them firmly together.

2. The structure specified in claim 1, in which said shoulder and the edge fitting it are substantially at right angles to the general plane of the wheel.

In testimony whereof I affix my signature.

FRANK HENRY GODFREY.